United States Patent
Pai

(10) Patent No.: US 11,650,961 B2
(45) Date of Patent: May 16, 2023

(54) MANAGING REPLICA UNAVAILABILITY IN A DISTRIBUTED FILE SYSTEM

(71) Applicant: RED HAT, INC., Raleigh, NC (US)

(72) Inventor: Prashanth S. Pai, Bengaluru (IN)

(73) Assignee: Red Hat, Inc., Raleigh, NC (US)

( * ) Notice: Subject to any disclaimer, the term of this patent is extended or adjusted under 35 U.S.C. 154(b) by 441 days.

(21) Appl. No.: 16/266,285

(22) Filed: Feb. 4, 2019

(65) Prior Publication Data
US 2020/0250147 A1  Aug. 6, 2020

(51) Int. Cl.
| | |
|---|---|
| G06F 16/182 | (2019.01) |
| G06F 16/185 | (2019.01) |
| G06F 16/178 | (2019.01) |
| G06F 11/20 | (2006.01) |
| G06F 11/30 | (2006.01) |
| G06F 11/16 | (2006.01) |

(52) U.S. Cl.
CPC ........ *G06F 16/183* (2019.01); *G06F 11/1662* (2013.01); *G06F 11/2094* (2013.01); *G06F 11/3034* (2013.01); *G06F 11/3055* (2013.01); *G06F 16/178* (2019.01); *G06F 16/185* (2019.01); *G06F 2201/82* (2013.01)

(58) Field of Classification Search
CPC .... G06F 16/183; G06F 16/178; G06F 16/185; G06F 11/1662; G06F 11/2094; G06F 11/3034; G06F 11/3055; G06F 2201/82
See application file for complete search history.

(56) References Cited

U.S. PATENT DOCUMENTS

| | | | | |
|---|---|---|---|---|
| 5,628,005 | A | * | 5/1997 | Hurvig ................ G06F 12/0813 |
| 6,148,412 | A | * | 11/2000 | Cannon ............... G06F 11/1448 |
| | | | | 714/6.31 |
| 6,591,266 | B1 | * | 7/2003 | Li ........................ G06F 16/9574 |
| | | | | 707/999.009 |
| 7,552,220 | B2 | * | 6/2009 | Marmigere ............. H04L 29/06 |
| | | | | 709/201 |
| 8,244,671 | B2 | * | 8/2012 | Chen ....................... G06F 16/10 |
| | | | | 707/610 |
| 8,935,206 | B2 | * | 1/2015 | Aguilera ............. G06F 11/1464 |
| | | | | 709/224 |

(Continued)

FOREIGN PATENT DOCUMENTS

EP          3376361 A2      9/2018

OTHER PUBLICATIONS

Barclay et al., "TerraServer Bricks—A High Availability Cluster Alternative", Microsoft Corporation (Year: 2004).*

(Continued)

*Primary Examiner* — Anhtai V Tran
*Assistant Examiner* — Huen Wong
(74) *Attorney, Agent, or Firm* — Kilpatrick Townsend & Stockton LLP

(57) ABSTRACT

Replica unavailability in a distributed file system can be managed. For example, a processing device can detect that a replica of data in a volume of a distributed file system is unavailable. In response to detecting that the replica is unavailable, the processing device can create a copy of the data in a memory location that is within the distributed file system and external to the volume. The processing device can then execute a write request by modifying both the data in the volume and the copy in the memory location (e.g., to ensure consistency between the two).

15 Claims, 3 Drawing Sheets

(56) References Cited

U.S. PATENT DOCUMENTS

| | | | |
|---|---|---|---|
| 8,954,406 B2 | 2/2015 | Rodriguez et al. | |
| 9,363,190 B2 | 6/2016 | Beloglazov et al. | |
| 9,807,164 B2 | 10/2017 | Wareing | |
| 11,016,992 B2* | 5/2021 | Hawa | H04L 67/1085 |
| 2004/0068579 A1* | 4/2004 | Marmigere | H04L 67/2819 |
| | | | 709/242 |
| 2005/0102370 A1* | 5/2005 | Lin | H04L 67/2852 |
| | | | 709/217 |
| 2006/0149807 A1* | 7/2006 | Ding | G06F 16/9574 |
| | | | 709/217 |
| 2007/0156984 A1* | 7/2007 | Ebata | G06F 3/067 |
| | | | 711/162 |
| 2007/0220014 A1* | 9/2007 | Emling | G06F 16/13 |
| 2011/0069833 A1* | 3/2011 | Volkoff | G06F 16/1748 |
| | | | 707/699 |
| 2011/0099346 A1* | 4/2011 | Toshine | G06F 3/0647 |
| | | | 711/162 |
| 2011/0320556 A1* | 12/2011 | Reuther | G06F 9/45558 |
| | | | 709/213 |
| 2014/0006465 A1* | 1/2014 | Davis | G06F 16/1752 |
| | | | 707/827 |
| 2014/0025628 A1* | 1/2014 | Tse | G06F 16/93 |
| | | | 707/609 |
| 2014/0089817 A1* | 3/2014 | Akkarbote | G06F 30/00 |
| | | | 715/753 |
| 2014/0201457 A1* | 7/2014 | Sinai | G06F 12/121 |
| | | | 711/135 |
| 2015/0066855 A1* | 3/2015 | Avati | G06F 16/134 |
| | | | 707/638 |
| 2015/0095597 A1* | 4/2015 | Ayanam | G06F 3/065 |
| | | | 711/162 |
| 2017/0235562 A1* | 8/2017 | Bafna | G06F 11/201 |
| | | | 718/1 |
| 2017/0249373 A1* | 8/2017 | Dhananjay | G06F 11/1471 |
| 2017/0344618 A1 | 11/2017 | Horowitz et al. | |

OTHER PUBLICATIONS

"Enabling Global Hadoop With Dell EMC ECS-Hadoop Storage-as-a-Service," Dell EMC, Mar. 2018, https://www.emc.com/collateral/white-papers/h44184-global-hadoop-ecs-wp.pdf.

"New BeeGFS Release Targets High-Availability Storage," Aug. 13, 2015, https://insidehpc.com/2015/08/new-beegfs-release-targets-high-availability-storage/.

Tuttle, R., "Self-Heal Your OpenStack Control Plane," CISCO, Mar. 5, 2016, https://blogs.cisco.com/cloud/self-heal-your-openstack-control-plane.

* cited by examiner

MANAGING REPLICA UNAVAILABILITY IN A DISTRIBUTED FILE SYSTEM

TECHNICAL FIELD

The present disclosure relates generally to distributed file systems. More specifically, but not by way of limitation, this disclosure relates to managing replica unavailability in a distributed file system.

BACKGROUND

A distributed file system stores directories and files in a hierarchical structure across multiple disks of multiple storage servers. Distributed file systems are different from, for example, object storage in which data is stored in a flat non-hierarchical namespace. One popular type of distributed file system is the Gluster file system, or GlusterFS.

Distributed file systems store data in bricks. A brick is a storage area on a physical disk (e.g., hard drive) or a virtual disk. Multiple bricks can be aggregated into a storage volume, or "volume," such that a single volume serves as a logical collection of two or more bricks spanning one or more servers in the distributed file system.

Volumes can be mounted as regular directories on client devices. This enables applications on the client devices to request that various file operations (e.g., read or write operations) be executed on the data in the volumes. And if a volume spans multiple bricks on multiple storage servers, the storage servers can collaborate to carry out the file operations requested by the applications.

In some cases, a volume can include one or more replicas (e.g., copies) of data stored in a brick. These replicas can be stored in their own bricks within the volume. The replicas can serve as backups in case the original data becomes unavailable, for example, due to the corruption or failure of the brick in which the original data is stored.

DETAILED DESCRIPTION

Figure 1:
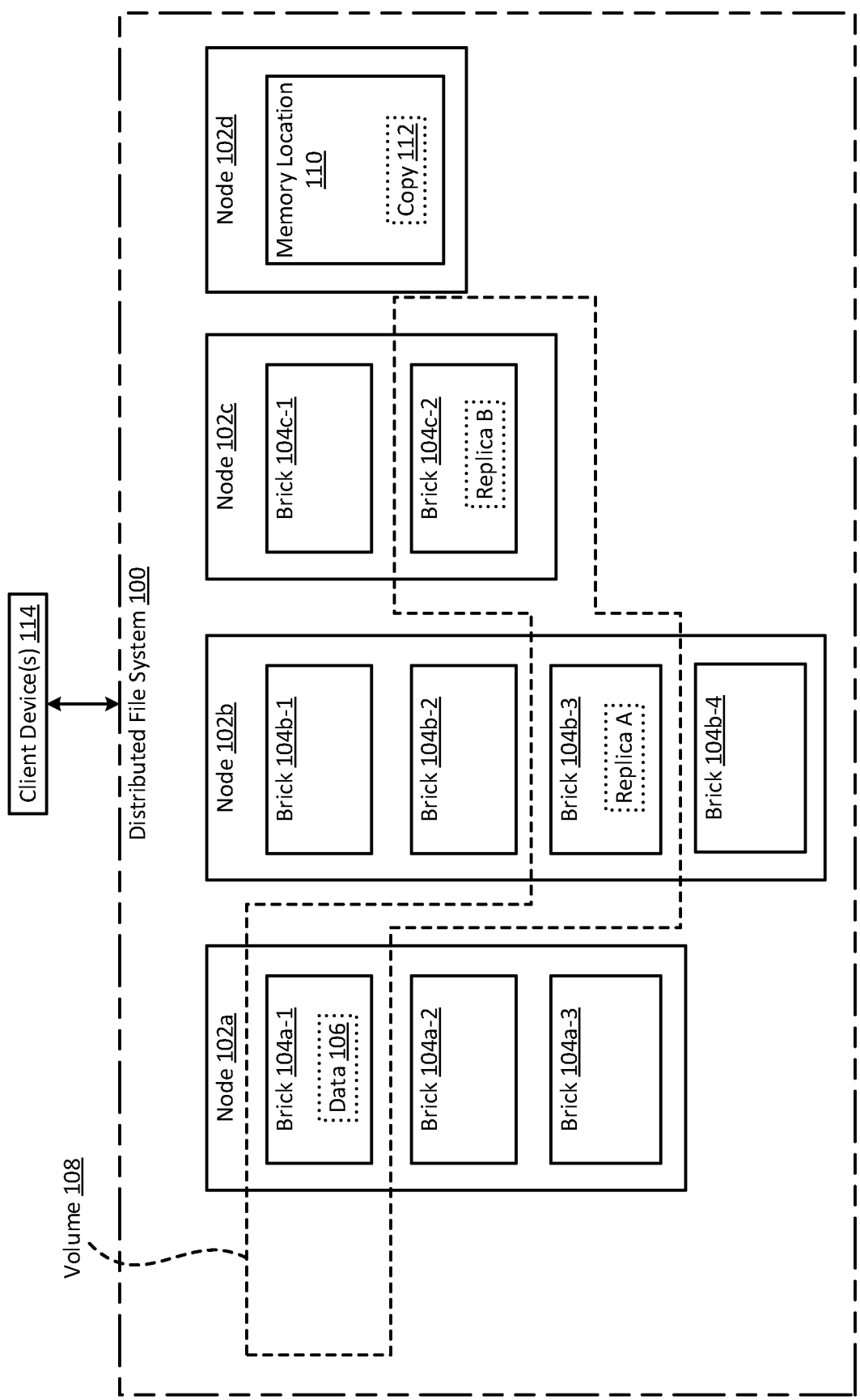
FIG. 1 is a block diagram of an example of a system for managing replica unavailability in a distributed file system according to some aspects.

Some distributed file systems require that all replicas of a piece of data be stored in the same volume as the piece of data. This creates numerous advantages, such as better isolation, easier administration, and the ability to easily apply the same properties to all of the data in the volume. But this also creates numerous problems. For example, if a replica becomes unavailable (e.g., due to a problem with a corresponding brick), the distributed file system may attempt to create another replica in the volume in order to fill the void. But if the distributed file system is unable to create the new replica (e.g., due to there being insufficient space in the volume), the distributed file system will be left without recourse. This loss of redundancy renders the distributed file system more susceptible to corruption and errors, and may result in reduced data availability and throughput.

Some examples of the present disclosure overcome one or more of the abovementioned problems by creating a copy of a piece of data in a designated memory location, or "hand-off location," that is within the distributed file system but outside the volume in which the piece of data is stored. The distributed file system can create the copy in the memory location upon detecting that one of the replicas within the volume is unavailable, in order to supplement the system until the replica becomes available again. Once the replica within the volume becomes available again, the distributed file system can delete the copy in the designated memory location (e.g., to conserve resources). This can help ensure that the distributed file system maintains its redundancy in the face of replica failures, which reduces errors and improves data availability.

As a particular example, the distributed file system can be a modified version of GlusterFS in which adjustments have been made to at least the automatic file replication (AFR) module to implement various aspects of the present disclosure. In this example, the distributed file system can store data in brick A of a volume. The distributed file system can also store a replica of the data in brick B of the volume. If brick B becomes unavailable (e.g., due to hardware failure or corruption), the modified AFR module can automatically copy of the data to a memory location outside of the volume. The memory location may or may not include another volume within the distributed file system. In some examples, the memory location is backed by one or more high-performance disks, such as solid-state hard drives. The copy of the data in the memory location can effectively serve as another replica of the data, which the distributed file system can then use to perform various tasks.

For example, the distributed file system can load balance read requests for the data by fulfilling some of the read requests using the data stored in brick A and others of the read requests using the copy stored in the memory location outside the volume. This can significantly increase the speed with which read requests are handled by the system.

In some examples, the distributed file system can maintain consistency between the data stored in brick A and the copy stored in the memory location. For example, in response to a write request to modify the data in brick A, the modified AFR module can not only modify the data in brick A, but also correspondingly modify the copy in the memory location to maintain consistency between both locations.

At a future point in time, the replica in brick C may become available again. If the replica in brick B becomes available, the modified AFR module can automatically synchronize the replica in brick B with the copy in the memory location, to ensure consistency between the two. For example, the modified AFR module can overwrite the replica in brick B with the memory location's data. The modified AFR module can then delete the copy from the memory location, thereby freeing up the memory location for subsequent use. Thus, the memory location serves as a temporary location for storing a temporary copy of the data in brick A.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of system for managing replica unavailability in a distributed file system 100 according to some aspects. The distributed file system 100 can include any number and combination of nodes (e.g., storage nodes). In this example, the distributed file system 100 includes nodes 102a-d, such as storage servers. At least some of the nodes 102a-d include bricks for storing data. For example, node 102a includes bricks 104a-1 through 104a-3, node 102b includes bricks 104b-1 through 104b-4, and node 102c includes bricks 104c-1 through 104c-2. But in other examples, each of the nodes 104a-d can have other amounts and combinations of bricks.

Multiple bricks can be combined to form a volume. For example, bricks 104a-1, 104b-3, and 104c-2 collectively form a single volume 108. Other combinations of bricks may also form other volumes in the distributed file system 100.

In this example, volume 108 includes data 106 and two replicas of the data 106. These replicas are designated Replica A (on node 102b) and Replica B (on node 102c) in FIG. 1. But other examples can involve more or fewer replicas of the data 106 on more or fewer nodes in the distributed file system 100.

At some point in time, one or both of Replicas A and B may become unavailable. This can slow down the distributed file system 100, reduce its ability to respond to read requests for the data 106, and reduce redundancy, which can result in a variety of problems. To avoid these problems, the distributed file system 100 can detect that one or both of Replicas A and B are unavailable and responsively take corrective action.

For example, the distributed file system 100 can determine that brick 104b-3 has gone offline, rendering Replica A unavailable. In response, the distributed file system 100 can create a copy 112 of the data 106 in a memory location 110 that is outside of the volume 108 (but still within the distributed file system 100). The memory location may be a preset location specifically designated for storing copies of the data 106 when replicas of the data 106 become unavailable. For example, the preset location may be a user-designated location specifically for these purposes. The memory location 110 can be a physical memory location (e.g., a hard drive) or a virtual memory location. For example, the memory location 110 can include another volume formed from one or more bricks on node 102d. As another example, the memory location 110 can be a location in random access memory (RAM). The copy 112 can serve as a temporary replica usable by the distributed file system 100.

After creating the copy 112 of the data 106, the distributed file system 100 can use the copy 112 in various ways. For example, the distributed file system 100 can balance a workload between the data 106 and the copy 112, such that at least one part of the workload is handled using the data 106 and another part of the workload is handled using the copy 112 in the memory location 110. In one such example, the distributed file system 100 can receive read requests from client device(s) 114, where a read request involves reading the data 106 from the distributed file system 100. The distributed file system 100 can respond to the read requests by distributing them at least partially among node 102a and node 102d, such that node 102a responds to its subset of read requests using the data 106 in brick 104a-1 and node 102d responds to its subset of read requests using the copy 112 in the memory location 110. This can significantly speed up the distributed file system's ability to respond to the read requests.

In other examples, the distributed file system 100 can receive write requests from the client device(s) 114. A write request involves somehow modifying the data 106, such as by adding information to the data 106 or removing information from the data 106. In response to a write request, the distributed file system 100 can modify the data 106 accordingly. The distributed file system 100 may also modify some or all available replicas, such as Replica B, to keep the replica(s) in synch with the data 106. The distributed file system 100 can further modify the copy 112 in the memory location 110 to keep the copy 112 in synch with the data 106. This can help ensure that the available replicas and/or the copy 112 in the memory location 110 are always up-to-date.

At some point, Replica B may become available again. The distributed file system 100 can detect that Replica B is available and automatically synchronize Replica B with the copy 112 (or the data 106) to ensure consistency between the two. For example, the distributed file system 100 can overwrite Replica B using the copy 112 in the memory location 110. After updating Replica B, the distributed file system 100 can delete the copy 112 from the memory location 110, thereby freeing up the memory location 110.

While the above example involves the creation of one temporary copy 112 in one memory location 110, other examples can involve the creation of any number any combination of temporary copies in any number and combination of memory locations external to the volume 108 (e.g., but still within the distributed file system 100). For example, if the distributed file system 100 detects that both Replica A and Replica B are unavailable, the distributed file system 100 can generate one copy of the data 106 in one memory location and another copy of the data 106 in another memory location. These copies can serve as temporary proxies for Replicas A and B while the replicas are unavailable. The distributed file system 100 can then use these copies as discussed above. For example, the distributed file system 100 can use both copies to perform load balancing. As another example, the distributed file system 100 can execute write requests at least partially by updating the copies, in order to maintain consistency between the data 106 the copies in the memory locations.

Figure 2:
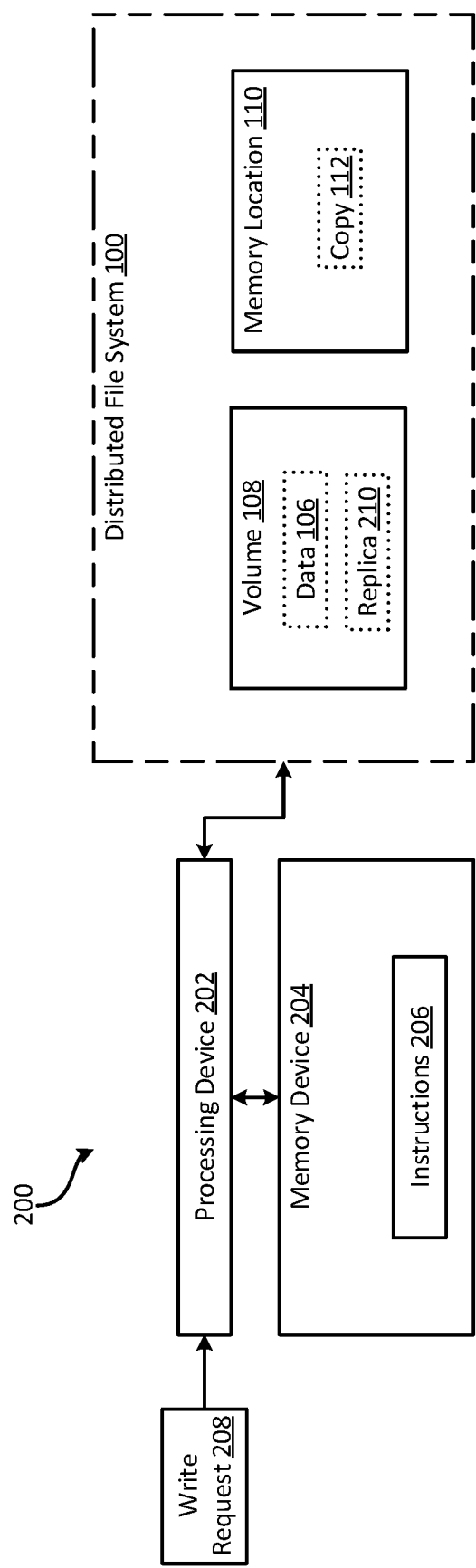
FIG. 2 is a block diagram of another example of a system for managing replica unavailability in a distributed file system according to some aspects.

FIG. 2 is a block diagram of another example of a system 200 for managing replica unavailability in a distributed file system 100 according to some aspects. The system 200 includes a processing device 202 communicatively coupled with a memory device 204. In some examples, the processing device 202 and the memory device 204 can be part of a node, such as one of the nodes 102a-d of FIG. 1.

The processing device 202 can include one processing device or multiple processing devices. Non-limiting examples of the processing device 202 include a Field-Programmable Gate Array (FPGA), an application-specific integrated circuit (ASIC), a microprocessor, etc. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C#, etc.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. In some examples, at least some of the memory device can include a medium from which the processing device 202 can read instructions 206. A computer-readable medium can include electronic, optical, magnetic, or other storage devices capable of providing the processing device 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the processing device 202 can detect that a replica 210 of data 106 in a volume 108 of a distributed file system 100 is unavailable. In response to detecting that the replica 210 is unavailable, the processing device 202 can create a copy 112 of the data 106 in a memory location 110. The memory location 110 is external to the volume 108 and may (or may not) exist within the distributed file system 100. The processing device 202 can then use the memory location 110 to perform various tasks. For example, the processing device 202 can receive a write request 208 involving modifying the data 106 in the volume 108. In response, the processing device 202 can execute the write request 208 at least partially by modifying the copy 112 in the memory location 110. For example, the processing device 20 can modify both the data 106 in the volume 108 and the copy 112 in the memory location 110, for example, to maintain consistency between the two.

Figure 3:
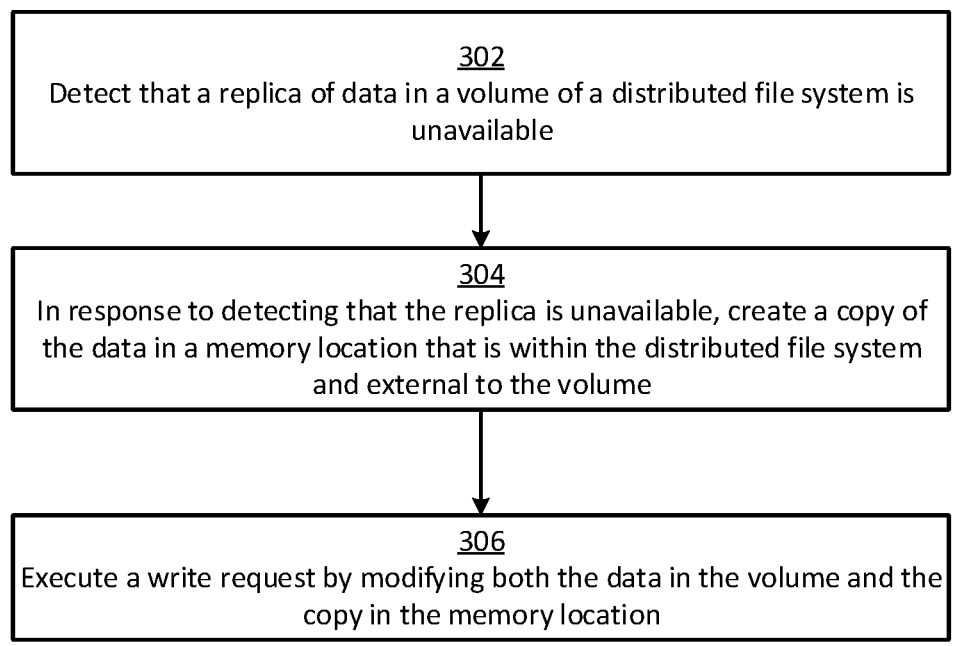
FIG. 3 is a flow chart of an example of a process for managing replica unavailability in a distributed file system according to some aspects.

In some examples, the processing device 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, a processing device 202 detects that a replica 210 of data 106 in a volume 108 of a distributed file system 100 is unavailable. For example, the processing device 202 can detect that the replica 210 is unavailable by attempting (e.g., periodically attempting) to access the replica 210. If the processing device 202 cannot access the replica 210, then the processing device 202 can determine that the replica 210 is unavailable. As another example, the processing device 202 can detect that the replica 210 is unavailable by attempting to access a brick in which the replica 210 is stored. If the processing device 202 cannot access the brick, then the processing device 202 can determine that the replica 210 is unavailable.

In block 304, the processing device 202 creates a copy 112 of the data 106 in a memory location 110 that is within the distributed file system 100 and external to the volume 108. The processing device 202 can create the copy 112 in response to detecting that the replica 210 is unavailable. The memory location 110 can include one or more storage areas on one or more disks.

In block 306, the processing device 202 executes a write request 208 for modifying the data 106 in the volume 108 by modifying both (i) the data 106 in the volume 108, and (ii) the copy 112 in the memory location 110. In some examples, the data 106 and the copy 112 are both modified in the same way to ensure consistency between the two.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A system comprising:
a distributed file system located on a server side of a client-server architecture, the client-server architecture including a client side that is remote from the server side, wherein the distributed file system is configured to receive write requests from client devices on the client side and perform write operations in response to receiving the write requests, the distributed file system including:
a plurality of server nodes on the server side, wherein the plurality of server nodes include at least one physical computer;
a volume spanning at least two server nodes of the plurality of server nodes, the volume including a first brick and a second brick, the second brick including data, and the first brick including a first replica that is an exact duplicate of the data;
a memory location that is located on a server node of the plurality of server nodes and external to the volume;
a processing device; and
a memory device including instructions that are executable by the processing device for causing the processing device to:
detect that the first replica has become inaccessible to the distributed file system;
in response to detecting that the first replica has become inaccessible to the distributed file system, create a second replica of the data in the memory location, the memory location being a location on the server side from which the data is retrievable by the distributed file system while the first replica is inaccessible to the distributed file system;
subsequent to creating the second replica in the memory location, receive a write request from a client device for modifying the data, the client device being located on the client side of the client-server architecture and remotely from the memory location;
in response to receiving the write request, execute the write request by modifying both the data in the second brick and the second replica in the memory location;
detect that the first replica in the first brick has become accessible to the distributed file system; and
in response to detecting that the first replica in the first brick has become accessible to the distributed file system:
obtain the second replica from the memory location;
overwrite the first replica in the volume using the second replica obtained from the memory location; and
remove the second replica from the memory location.

2. The system of claim 1, wherein the memory device further includes instructions that are executable by the processing device for causing the processing device to, subsequent to creating the second replica in the memory location:
balance a workload among the data in the volume and the second replica in the memory location such that at least one part of the workload is handled using the data in the volume and another part of the workload is handled using the second replica in the memory location.

3. The system of claim 1, wherein the memory location includes another volume of the distributed file system.

4. The system of claim 1, wherein the memory location is a user-designated location specifically for storing the second replica of the data when the first replica of the data is unavailable to the distributed file system.

5. The system of claim 1, wherein the memory location is a first memory location, and wherein the memory device further includes instructions that are executable by the processing device for causing the processing device to:
   access a third replica stored in a third brick of the volume, the third replica being another exact duplicate of the data;
   subsequent to accessing the third replica, detect that the third replica of the data has become inaccessible to the distributed file system;
   in response to detecting that the third replica has become inaccessible to the distributed file system, create a fourth replica of the data in a second memory location that is also within the distributed file system and external to the volume, the second memory location being located on a server node of the plurality of server nodes on the server side; and
   in response to receiving the write request from the client device, execute the write request by modifying the data in the volume, the second replica in the first memory location, and the fourth replica in the second memory location.

6. The system of claim 5, wherein the memory device further includes instructions that are executable by the processing device for causing the processing device to:
   balance a workload among the data in the volume and the second and fourth replicas such that at least one part of the workload is handled using the data in the volume, another part of the workload is handled using the second replica in the first memory location, and still another part of the workload is handled using the fourth replica in the second memory location.

7. A method comprising:
   providing a distributed file system on a server side of a client-server architecture, the client-server architecture including a client side that is remote from the server side, wherein the distributed file system is configured to receive write requests from client devices on the client side and perform write operations in response to receiving the write requests, the distributed file system including:
      a plurality of server nodes on the server side, wherein the plurality of server nodes include at least one physical computer;
      a volume spanning at least two server nodes of the plurality of server nodes, the volume including a first brick and a second brick, the second brick including data, and the first brick including a first replica that is an exact duplicate of the data; and
      a memory location that is located on a server node of the plurality of server nodes and external to the volume;
   detecting, by a processing device of the distributed file system, that the first replica has become inaccessible to the distributed file system;
   in response to detecting that the first replica has become inaccessible to the distributed file system, creating, by the processing device, a second replica of the data in the memory location;
   subsequent to creating the second replica in the memory location, receiving, by the processing device, a write request from a client device for modifying the data, the client device being located on the client side of the client-server architecture and remotely from the memory location;
   in response to receiving the write request, executing, by the processing device, the write request by modifying both the data in the second brick and the second replica in the memory location;
   detecting, by the processing device, that the first replica in the first brick has become accessible to the distributed file system; and
   in response to detecting that the first replica in the first brick has become accessible to the distributed file system:
      obtaining, by the processing device, the second replica from the memory location:
      overwriting, by the processing device, the first replica in the volume using the second replica obtained from the memory location; and
      removing, by the processing device, the second replica from the memory location.

8. The method of claim 7, further comprising, subsequent to creating the second replica in the memory location:
   balancing a workload among the data in the volume and the second replica in the memory location such that at least one part of the workload is handled using the data in the volume and another part of the workload is handled using the second replica in the memory location.

9. The method of claim 7, wherein the memory location includes another volume of the distributed file system.

10. The method of claim 7, wherein the memory location is a preset location specifically designated for storing the second replica of the data when the first replica of the data is unavailable to the distributed file system.

11. The method of claim 7, wherein the memory location is a first memory location, and further comprising:
   accessing a third replica stored in a third brick of the volume, the third replica being another exact duplicate of the data;
   subsequent to accessing the third replica, detecting that the third replica of the data has become inaccessible to the distributed file system;
   in response to detecting that the third replica has become inaccessible to the distributed file system, creating a fourth replica of the data in a second memory location that is also within the distributed file system and external to the volume, the second memory location being located on a server node of the plurality of server nodes on the server side; and
   in response to receiving the write request from the client device, executing the write request by modifying the data in the volume, the second replica in the first memory location, and the fourth replica in the second memory location.

12. The method of claim 11, further comprising
   balancing a workload among the data in the volume and the second and fourth replicas such that at least one part of the workload is handled using the data in the volume, another part of the workload is handled using the second replica in the first memory location, and still another part of the workload is handled using the fourth replica in the second memory location.

13. A non-transitory computer-readable medium comprising program code that is executable by a processing device of a distributed file system located on a server side of a client-server architecture, the client-server architecture including a client side that is remote from the server side, and the distributed file system including:

a plurality of server nodes on the server side, wherein the plurality of server nodes include at least one physical computer;

a volume spanning at least two server nodes of the plurality of server nodes, the volume including a first brick and a second brick, the second brick including data, and the first brick including a first replica that is an exact duplicate of the data; and a memory location that is located on a server node of the plurality of server nodes and external to the volume;

wherein the program code is executable for causing the processing device to:

detect that the first replica is inaccessible to the distributed file system;

in response to detecting that the first replica is inaccessible to the distributed file system, create a second replica of the data in the memory location, the memory location being a location on the server side from which the data is retrievable by the distributed file system while the first replica is inaccessible to the distributed file system;

subsequent to creating the second replica in the memory location, receive a write request from a client device for modifying the data, the client device being located on the client side of the client-server architecture and remotely from the memory location;

in response to receiving the write request, execute the write request by modifying both the data in the second brick and the second replica in the memory location;

detect that the first replica in the first brick is accessible to the distributed file system; and in response to detecting that the first replica is accessible to the distributed file system:

obtain the second replica from the memory location;

overwrite the first replica in the volume using the second replica obtained from the memory location; and remove the second replica from the memory location.

14. The non-transitory computer-readable medium of claim 13, wherein the memory location is a first memory location, and further comprising program code that is executable by the processing device for causing the processing device to:

access a third replica stored in a third brick of the volume, the third replica being another exact duplicate of the data;

subsequent to accessing the third replica, detect that the third replica of the data has become inaccessible to the distributed file system;

in response to detecting that the third replica has become inaccessible to the distributed file system, create a fourth replica of the data in a second memory location that is also within the distributed file system and external to the volume, the second memory location being located on a server node of the plurality of server nodes on the server side; and in response to receiving the write request from the client device, execute the write request by modifying the data in the volume, the second replica in the first memory location, and the fourth replica in the second memory location.

15. The non-transitory computer-readable medium of claim 14, comprising program code that is executable by the processing device for causing the processing device to:

balance a workload among the data in the volume and the second and fourth replicas such that at least one part of the workload is handled using the data in the volume, another part of the workload is handled using the second replica in the first memory location, and still another part of the workload is handled using the fourth replica in the second memory location.

* * * * *